United States Patent [19]

Anderson

[11] 4,347,505
[45] Aug. 31, 1982

[54] DEVICE FOR CONTROLLING A CIRCUIT
[75] Inventor: Gary B. Anderson, Tahoe City, Calif.
[73] Assignee: Antroy Enterprises, Inc., San Francisco, Calif.
[21] Appl. No.: 7,411
[22] Filed: Jan. 29, 1979
[51] Int. Cl.³ .................. G01G 23/20; H01C 10/10
[52] U.S. Cl. .................................. 340/666; 49/31; 49/264; 177/210 R; 307/119; 338/47; 338/100
[58] Field of Search ............... 340/666; 338/47, 99, 338/100; 307/116, 119; 177/45, 210 R; 49/31, 264, 273

[56] References Cited

U.S. PATENT DOCUMENTS

| | | | |
|---|---|---|---|
| 2,951,817 | 9/1960 | Meyers | 338/47 X |
| 2,962,274 | 2/1960 | Thurston | 177/45 |
| 3,125,739 | 3/1964 | Deibel et al. | 338/99 |
| 3,629,774 | 12/1971 | Crites | 338/99 X |
| 3,643,753 | 2/1972 | Godwin et al. | 177/210 R X |
| 3,777,828 | 12/1973 | Dietemeyer | 177/210 R X |
| 4,003,487 | 1/1977 | Downing | 340/666 X |

FOREIGN PATENT DOCUMENTS 1216005 12/1970 United Kingdom .................. 338/47

Primary Examiner—John W. Caldwell, Sr.
Assistant Examiner—Joseph E. Nowicki
Attorney, Agent, or Firm—Robert R. Tipton

[57] ABSTRACT

A pressure sensing mat utilizes a thin sheet of semiconductor material that has an electrical conductivity generally invariable as to pressure applied to the mat material. The sheet of semiconductor material is sandwiched between sheets of copper, steel or aluminum foil which are in mechanical contact with the semiconductor sheet to define a pair of electrodes. The electrodes are connected to various circuits including a pressure (voltage) threshold detector, a learning circuit for establishing a learned threshold, a circuit for matching time-pressure patterns and a circuit for detecting pressures between a predetermined maximum and minimum level. A matrix of pressure sensing mats is utilized with various circuits to detect sequential pressure patterns.

8 Claims, 15 Drawing Figures

DEVICE FOR CONTROLLING A CIRCUIT

BACKGROUND OF THE INVENTION

This invention relates generally to pressure sensitive mats and in particular to semiconductor pressure sensing mats and circuits for detecting various pressure parameters and performing various functions.

The pressure sensitive treadles or mats of the prior art that were used to activate doors or intrusion detecting devices generally were of the switch type, that is, either the electrical current was switched "on" or "off" when pressure was applied to the mat. Some prior art mats utilized fibrous or porous materials that were impregnated with an electrical conducting material such as graphite or carbon. Such mats were designed to be rather thick and were readily compressible. They operated on the principle that compressing the graphite, carbon or other conductive material, caused a reduction in electrical resistance of the mat core material. In other words, there had to be substantial motion or deflection of the mat material to produce the resistance change. The problem with such mats was their instability under varying conditions of temperature and moisture content. For this reason, accurate measurement of pressures was not possible.

SUMMARY OF THE INVENTION

The pressure sensing mat of the present invention comprises, basically, a thin elastically deformable sheet of semiconductor material having an electrical conductivity generally invariable according to internal pressure applied to the semiconductor mat material itself. The mat material is sandwiched between two sheets of metal selected from the group consisting of aluminum, steel and copper and alloys thereof which are placed in mechanical contact with the semiconductor material. A circuit for measuring threshold voltage (which is also a function of pressure on the electrodes on the mat if connected to the electrode. Other circuits in which the mat is used include a learning circuit for establishing a threshold voltage and a circuit for measuring pressure-time functions such as for signature verification.

A further embodiment of the present invention utilizes a plurality of pressure sensing mats arranged in ordered array of rows and columns with scanning circuits to detect ordinate and abscissa coordinates of pressure locations.

It is, therefore, an object of the present invention to provide a pressure sensing mat having variable electrical conductivity in proportion to applied pressure.

It is a further object of the present invention to provide a pressure sensing mat and circuits therefore.

It is another object of the present invention to provide a pressure sensing mat and circuit which produces an output signal when a predetermined minimum pressure is applied to the mat.

It is still a further object of the present invention to provide a pressure sensing mat in which a learning circuit is employed to establish the predetermined pressure level to be detected.

It is still another object of the present invention to provide a pressure sensing mat and circuit therefore that produces an output signal when a pressure is applied to the mat which is between a predetermined maximum and minimum pressure.

It is yet another object of the present invention to provide a pressure sensing mat and circuit therefore in which a pressure-time function is measured and compared with a prior pressure-time function.

It is yet a further object of the present invention to provide a pressure sensing mat and circuit therefore adapted as a sectional unit of a matrix of pressure sensing mats.

It is a further object of the present invention to provide a matrix of pressure sensing mats and circuits therefore to act as an area monitor.

It is another object of the present invention to provide a matrix of pressure sensing mats and circuits therefore as a path determining device.

These and other objects of the present invention will be manifest upon study of the following detailed description when taken together with the drawings.

BRIEF DESCRIPTION OF THE DRAWINGS

FIG. 4 is a circuit diagram for a pressure sensing mat of the present invention in which pressure-time variations are used to verify signatures or the like.

FIG. 4A is a graph showing a typical pressure-time curve for a signature.

DESCRIPTION OF THE PREFERRED EMBODIMENT

Figure 1:
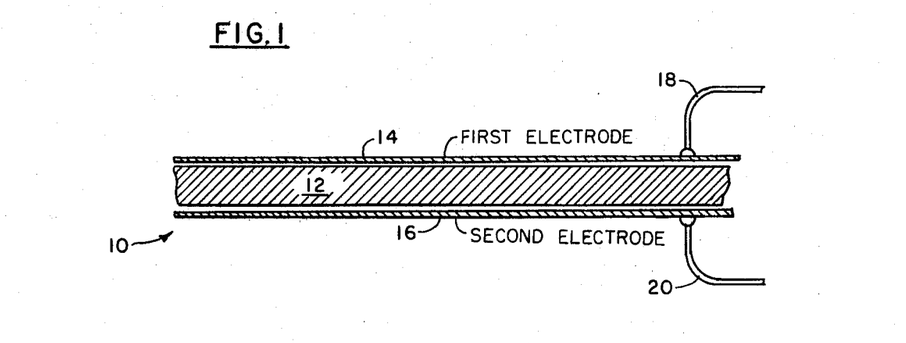
FIG. 1 is a cross-sectional elevational view of the typical pressure sensing mat of the present invention.

With reference to FIG. 1, there is illustrated an elevational cross-sectional view of the pressure sensing mat 10 of the present invention which comprises, basically, a core 12 sandwiched between a first electrode 14 and a second electrode 16. Leads 18 and 20 are electrically connected, respectively, to electrodes 14 and 16, and are used to connect pressure sensing mat 10 to the other circuit members.

Specifically, core 12 comprises a thin elastically deformable sheet of semiconducting material having an irregular surface and an electrical conductivity generally invariable according to internal pressure of the material. Such a material having an irregular surface can be a thin sheet of fibrous material, such as cellulose fiber, impregnated with colloidal graphite. A typical core 12 would have a thickness approximately 0.003 cm. Core 12 can also comprise a thin plastic sheet material having colloidal graphite suspended in the plastic in sufficient quantity to make it anti-static but retaining a relatively high resistivity. The surface of the plastic must be roughened to a degree as to cause microscopic irregularities or ridges and depressions to be created in the surface of the plastic. The thickness of the plastic sheet material can be approximately 0.001 cm.

First and second electrodes 14 and 16, respectively, are typically fabricated from aluminum, steel or copper foil when used with core 12 having a colloidal graphite filler.

Electrodes 14 and 16 are arranged to be in contact with the roughened surface of core 12 such that the surface of the metal foil and the surface of core 12 interact mechanically.

Where the variable resistance materials of the prior art utilize granular or loosely woven electrically conductive fibers to achieve their variable resistance with applied pressure, core 12 of the present invention does not rely on such phenomena.

As distinguished from other materials of the prior art, the variable resistance of mat 12 is achieved through the surface roughness or microscopic surface irregularities combined with the resilience or elastic deformability of the material. When no significant pressure is applied to the electrodes placed on the surface of core 12, the electrodes will "ride on" or be supported on the "peaks" or tips of the ridges of the surface irregularities. When a pressure is applied to the electrodes, the surface irregularities are flattened or compressed and are caused to spread out over a larger area or surface of the electrode thus causing an increase in surface area through which electrons can pass and a resulting decrease in mat resistance. When the pressure on the electrode is released, since the core 12 material is elastically deformable, the electrodes will be forced away from the surface of core 12 to again "ride" on the tips of the surface irregularities.

Because of this, it has been found that the use of an electrically conductive paint or glue to hold the electrodes to the core material will destroy the ability of the combination to be sensitive to pressure. In a like manner, if a conductive fluid is placed between the electrode and the core material, the combination will again become insensitive to pressure. The operation of mat 10, therefore, does not depend upon the compression of the fibers within core 12 to increase conductivity, but rather, it depends upon the interaction of the surface of the aluminum, steel or copper, or any of their alloys, with the microscopic surface irregularities of the material of core 12.

Figure 2:
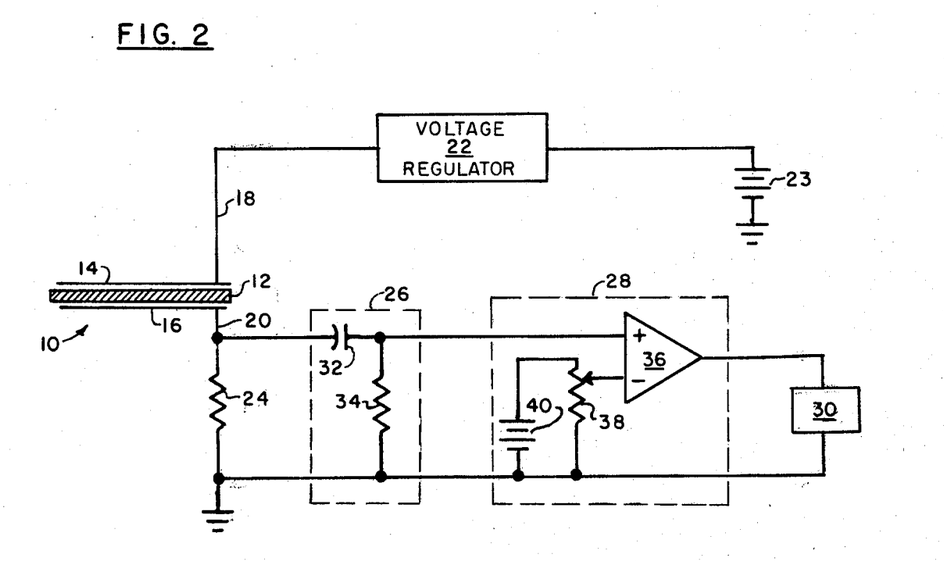
FIG. 2 is a schematic circuit diagram of a threshold and learning circuit for use with the pressure sensing mat of the present invention.

With reference to FIG. 2, there is illustrated a schematic diagram of a typical circuit used to actuate a device 30 such as a relay which in turn could actuate any device such as a door, light, relay or other signal generating device, or the like.

In FIG. 2, electrode 14 is connected to one side of a voltage regulator 22 while electrode 16 is connected first, to a biasing resistor 24, then to a learning circuit 26, which in turn, is connected to a voltage (pressure) threshold detector circuit 28. The output of threshold detector 28 is, in turn, connected to device 30 to be actuated. The other side of voltage regulator 22 is connected to power supply 23.

Learning circuit 26 comprises a capacitor 32 connected in series with electrode 16 and voltage threshold circuit 28. Resistor 34 of learning circuit 26 is connected in parallel with threshold circuit 28.

Threshold circuit 28 comprises an operational or comparison amplifier 36 whose output is connected to device 30 to be actuated and whose one input side is connected to capacitor 32 while its other side is connected to potentiometer 38. Potentiometer 38 is connected in series with D.C. power supply 40.

To operate the circuit of FIG. 2, a weight is applied to mat 10, for example, a 150 pound man steps on electrode 14 to compress electrodes 14 and 16 against core 12. When this occurs, a current is caused to flow through biasing or sensitivity resistor 24 to create a voltage drop across resistor 24 and a voltage transient across capacitor 32 of learning circuit 26. Capacitor 32 and resistor 34 are selected to provide a relatively long time constant for learning circuit 26.

Depending upon the setting of potentiometer 38, the transient electrical signal or voltage across capacitor 32 is detected by comparison or operational amplifier 36, and, if the transient voltage is above the threshold voltage set for amplifier 36, a signal is transmitted to actuating circuit 30, for example, a door, causing it to open.

Since the voltage or electrical signal appearing on the amplifier 36 side of capacitor 32 will slowly decay if the weight is not removed from mat 20, the voltage will slowly decay to below the threshold value for the amplifier and the output signal to actuator 30 will stop and, for example, the door will close.

If, however, the 150 pound man proceeds to step off mat 10 and immediately thereafter, say, a 100 pound man steps on mat 10, his weight will be insufficient to cause a high enough voltage drop across resistor 24 and no transient will appear at the input side of amplifier 36 though capacitor 32. Thus, amplifier 36 will not emit an output signal to cause circuit 30 to be actuated.

However, if a 200 pound man were to step on mat 10, a higher voltage drop would appear across resistor 24 resulting on a transient voltage equal to the difference between the voltage drop caused by the 150 pound man and the voltage drop caused by the 200 pound man to appear across capacitor 32 and the input of amplifier 36.

This would, of course, cause an output signal from amplifier 36 to actuate circuit 30.

Figure 3:
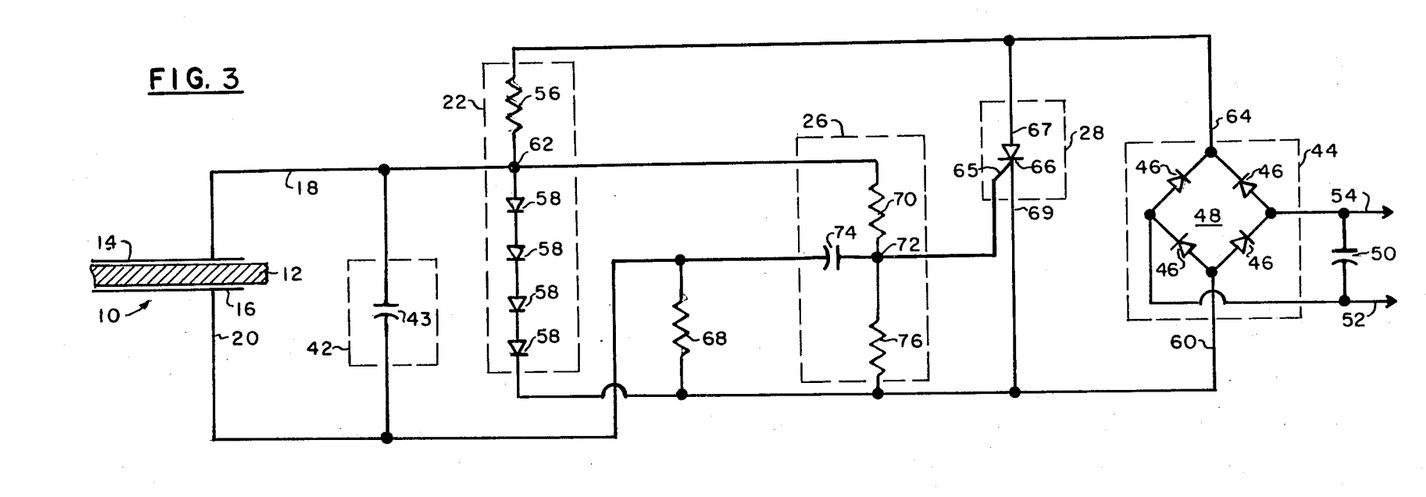
FIG. 3 is a circuit diagram for the pressure sensing mat of the present invention adapted for use with an alternating current voltage supply.
Figure 3A:
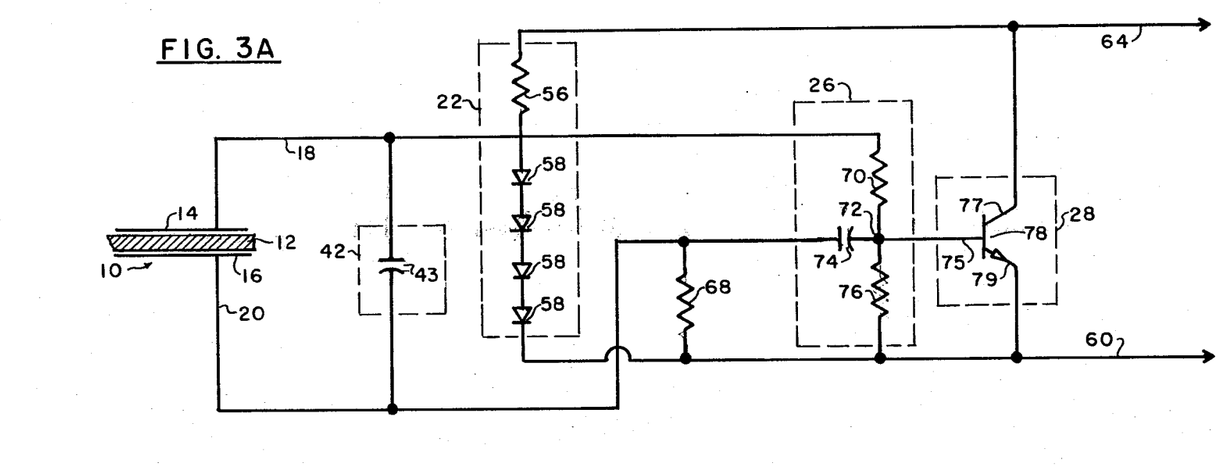
FIG. 3A is a circuit diagram for the pressure sensing mat of the present invention adapted for use with a direct current voltage supply.

A more detailed circuit diagram is shown in FIGS. 3 and 3A. The circuit of FIG. 3 is adapted for use with an alternating current source of supply, while the circuit of FIG. 3A is adapted for use with a direct current source of supply.

With reference to FIG. 3, voltage regulator circuit 22, voltage threshold circuit 28 and learning circuit 26 are shown in greater detail. In addition, a noise eliminator circuit 42 is also provided. Noise eliminator circuit 42 comprises a capacitor 43 connected across electrodes 14 and 16.

Also shown in FIG. 3, at the output end of the circuit, is rectifier circuit 44 used to convert the alternating current supplied to the circuit to a pulsating direct current.

In particular, rectifier circuit 44 comprises a set of four diodes 46 connected as a Wheatstone bridge 48 in combination with noise eliminating capacitor 50 connected across output leads 52 and 54.

With respect to voltage regulator circuit 22, this circuit comprises a resistor 56 connected in series with a plurality of serially connected zener diodes 58. The other end of serially connected diodes 58 is connected to one input side 60 of Wheatstone bridge circuit 48.

The junction point 62 at the other end of serially connected diodes 58 and resistor 56 is also connected to lead 18 of electrode 14. The other end of resistor 56 is connected to the other input side of Wheatstone bridge circuit 48.

Threshold circuit 28 of FIG. 3 comprises a silicon rectifier 66 having an anode 67, a cathode 69 and a gate 65. Cathode 69 is connected to input 60 of rectifier 44 while anode 67 is connected to the other side of rectifier 44. Gate 65, used to trigger silicon rectifier 66, is connected to junction point 72 of learning circuit 26.

Learning circuit 26 comprises a first resistor 70 having one end connected to junction point 62 of voltage regulator circuit 22 with its other end is connected to junction point 72, which in turn, as noted above, is connected to the gate 65 of silicon rectifier 66, as well as one side of capacitor 74 and one end of second resistor 76. Anode 67 of silicon rectifier 66 is connected to input side 64 of Wheatstone bridge 48 (rectifier circuit 44), while cathode 69 of silicon rectifier 66 (as noted above) is connected to input side 60 of Wheatstone bridge circuit 48.

The other side of capacitor 74 is connected to lead 20 and electrode 16 of mat 10. The other end of second resistor 76 is connected to the input side 60 of rectifier circuit 44.

With reference to FIG. 3A, there is illustrated a circuit similar in all respects to the circuit of FIG. 3 with the exception that rectifier circuit 44 is not used and silicon rectifier 66 is replaced by transistor 78 in threshold detector 28.

In the circuit of FIG. 3A, junction point 72 of learning circuit 26 is connected to the base of transistor 78 while its collector is connected to output lead 64 and its emitter is connected to output lead 60.

With respect to the operation of the circuit of FIG. 3, when, say, a 100 pound weight is applied to mat 10, a voltage drop will appear across sensitivity resistor 68 and a transient will appear across capacitor 74. Sensitivity resistor 68 is sized to a value that will give a signal for about a half loaded mat 10. Capacitor 74 and resistors 56, 70 and 76 are sized to give a generally long time constant.

The transient voltage across capacitor 74 will also appear at gate 65 of silicon rectifier 66 causing it to conduct, thus creating a signal across output leads 52 and 54.

The voltage to mat 10 is maintained at a generally constant value by voltage regulator 22 using resistor 56 in series with zener diodes 58. For this configuration, node or connection point 62 remains at a relatively constant voltage independent of any fluctuating voltage across inputs 60 and 64 of rectifier circuit 44.

With respect to the operation of the circuit of FIG. 3A, when a weight is applied to mat 10, a voltage drop will occur across resistor 68 and a transient voltage will appear across capacitor 74. The transient voltage will also appear at base 75 of transistor 78 which causes transistor 78 to conduct thus creating a signal across leads 60 and 64. In the case of the circuit of FIG. 3A, the resulting output current through leads 60 and 64 will be somewhat proportional to the weight applied to mat 10. It should be noted that all previous circuits, i.e., the circuits of FIGS. 2 and 3, can be made operational without the use of learning circuit 26. In this situation the circuit of FIG. 3A will trigger at a set weight determined by the parameters of the threshold device 28, mat 10, sensitivity resistor 68 and the voltage at junction 62.

Figures 4, 4A:
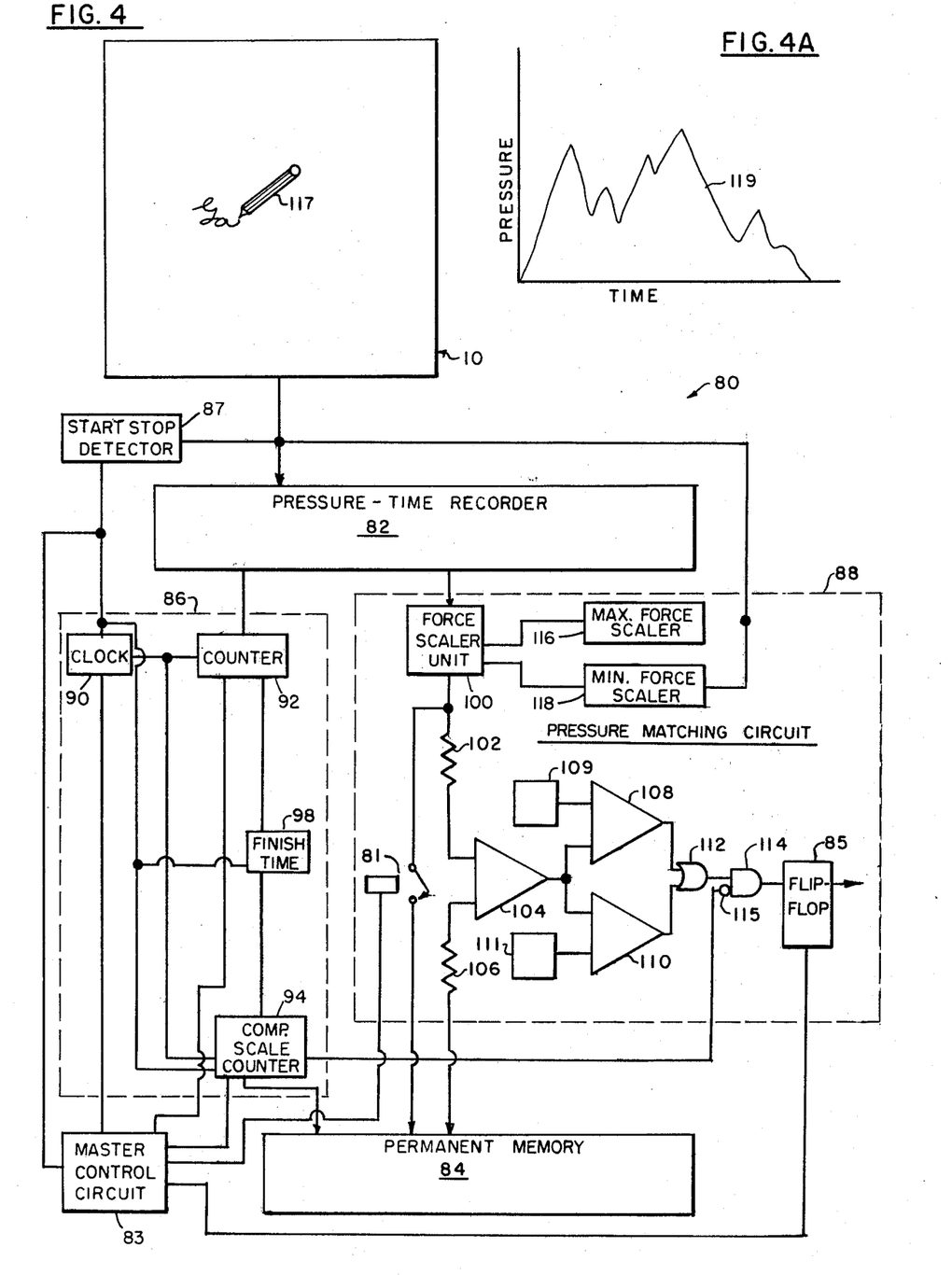

With respect to FIGS. 4 and 4A, there is illustrated a block circuit diagram for a device for verifying signatures by means of a pressure-time diagram as illustrated in FIG. 4A.

Signature verifying circuit 80 comprises a pressure sensing mat 10 of the type previously described for FIG. 1, which is connected to a pressure-time recorder or temporary storage memory 82. A library of pressure-time recordings is stored in permanent storage memory 84. The two pressure-time recordings are then compared using time scale adjusting circuit 86 in conjunction with pressure matching circuit 88.

Scale adjusting circuit 86 comprises a clock 90 connected to a clock pulse counter 92. Clock 90 is also connected to scale timer 94 and finish time element 98.

Pressure matching circuit 88 comprises, basically, a maximum pressure detector 116 and a minimum pressure detector 118, connected in parallel, and connected to a scale force adjusting circuit 100. Force adjusting circuit 100 is connected through resistor 102 to one input side of comparison amplifier 104. The other input side of comparison amplifier 104 is connected through resistor 106 to permanent memory 84.

Signature verifier circuit 80 also comprises a start-stop detector 87 which connects pressure sensing mat 10 to clock 90, and scale timer 94. A master control circuit 83 is used as a central control means for signature verifier circuit 80 and is connected to start-stop detector 87, compare scaling control 94, one side of control-permanent memory transfer switch 81 and flipflop circuit 85.

A control-permanent memory transfer switch or relay 81 is used to connect the output side of force adjusting circuit 100 either to permanent memory 84 or master control unit 83, depending upon whether the signature is to be written for entry into the permanent memory 84 or comparison with a signature already stored in permanent memory 84.

The output side of comparison amplifier 104 is connected to one input side of first deviation amplifier 108 and one input side of second deviation amplifier 110. The output side of deviation amplifiers 108 and 110 are connected to an input side of OR-gate 112. The output of OR-gate 112 is connected to one input side of AND-gate 114. The other input side of AND-gate 114 is connected to scale timer 94 through inverter 115.

The output side of AND-gate 114 is connected to the input side of flip-flop circuit 85, the output of which is used to indicate a "no output signal" condition.

The sampled forces on sensing mat 10 are measured for maximum and minimum forces by maximum force or pressure scaling unit 116 and minimum force or pressure scaling unit 118.

Pressure sensing mat 10 is used with a normal pen or pencil 117 to measure the vertical force or pressure produced during writing of a signature to create a pressure (force) vs. time diagram 119, as shown in FIG. 4A. The maximum and minimum forces measured during the signature learning mode are retained by maximum force scaling unit 116 and minimum force scaling unit 118 and are used in conjunction with scale force adjusting circuit 100 during the comparison phase. The time period is normalized from the start of the signature to its end by scale adjusting circuit 86.

In particular, when a pen or writing implement 117 is applied to mat 10, start-stop detector 87 is activated upon detection of a predetermined minimum pressure to start clock 90 to begin counting in predetermined time increments while the pressure values are being recorded in temporary storage memory 82. Clock 90 continues to count as long as pen 117 is applying a pressure to mat 10 which is greater than the predetermined minimum detectable pressure. At the end of the signature when pen 117 is raised, clock 90 will stop its count. The last count value of clock pulse counter 92 is saved in finished time element 98.

Either automatically upon completion of the signature or by command from control unit 83, clock 90 will again operate to increment counter 92 and comparison scaling counter 94. Comparison scaling counter 94 divides the number of incoming clock pulses by the last value from counter 92 as saved in finished time element 98 and then multiplies this result by the number of memory cells of the signature that is pre-recorded in permanent memory 84. Each memory cell corresponds to a predetermined time period when the original signature was recorded.

This produces an index to the signature in permanent memory 84 which varies exactly from zero to the maximum size of space in memory 84. The size of each memory work space is arranged to be large enough to contain any signature of reasonable length.

During the comparison phase of the signature verifier, the count from counter 92 will vary from 0 to the end of the time of the signature just written (and stored in temporary memory 82) while comparison counter 94 will vary from 0 to the end of signature stored in permanent memory 84. The two signatures are then scanned in time increments for each signature corresponding to the signature writer's pen position along the signature.

The following tabulation illustrates the settings and conditions of the various modes of operation of the signature verifying circuit 80:

LEARNING SIGNATURE MODE

PHASE A: Signature being recorded preliminary to storage in permanent memory 84 as master signature for comparison.

| Circuit or Unit | Setting or Condition |
| --- | --- |
| Clock 90 | Starts pulsing upon signal from start-stop circuit 87. |
| Counter 92 | Initially set to "0". Counts pulses from clock 90 during signature. |
| Finish Time Element 98 | Reset. |
| Comparison Scale Counter 94 | Reset. |
| Permanent Memory 84 | Off. |
| Temporary Memory 82 | On. |
| Transfer Switch 81 | Disconnect from memory 84. |
| Master Control Unit 83 | Programmed to reset circuit elements to Phase B at the end of signature. |
| Max. Force Scaling Unit 116 | Set to record maximum force observed. |
| Min. Force Scaling Unit 118 | Set to record minimum force observed. |
| Flip-flop Circuit 85 | No comparison. |

END OF SIGNATURE

PHASE B: Transition phase between recording signature and transferring signature to premanent storage memory 84.

| Circuit or Unit | Setting or Condition |
| --- | --- |
| Clock 90 | Off |
| Counter 92 | Stop count and hold last count. |
| Finish Time Element 98 | Save value of last count from counter 92. |
| Comparison Scaling Unit 94 | Off. |
| Max. Force Scaling Unit 116 | Save maximum force value. |
| Min. Force Scaling Unit 118 | Save minimum force value. |
| Master Control Unit 83 | Programmed to reset circuit elements to Phase C after Phase B. |
| Transfer Switch 81 | Disconnect from memory 84. |
| Flip-flop Circuit 85 | No comparison. |

TRANSFER SIGNATURE TO MEMORY

PHASE C: Signature stored in temporary memory 82 is transferred to permanent memory 84.

| Circuit or Unit | Setting or Condition |
| --- | --- |
| Transfer Switch 81 | Set to connect force scaling unit 100 to permanent memory 84. |
| Permanent Memory 84 | Record only condition. |
| Finish Time Element 98 | Hold value. |
| Max. Force Scaling Unit 116 | Hold value. |
| Min. Force Scaling Unit 118 | Hold value. |
| Clock 90 | Continue to count until count of counter 92 is equal to finish time element 98 count then stop. |
| Comparison Scale Counter 94 | Count and perform time scaling. |
| Counter 92 | Continue count. |
| Force Scaling Unit 100 | Perform force scaling function. |

COMPARE SIGNATURE MODE

PHASE D: Input signature is compared to stored signature. In all prior phases, the output signal is ignored. In Phase D, the output signal from flip-flop circuit 85 indicates whether signature is genuine.

| Circuit or Unit | Setting or Condition |
| --- | --- |
| Transfer Switch 81 | Disconnected from memory 84. |
| Permanent Memory 84 | Read only condition. |
| Finish Time Element 98 | Hold value. |
| Max. Force Scaling Unit 116 | Hold Value. |
| Min. Force Scaling Unit 118 | Hold Value. |
| Clock 90 | Continues to run until counter 92 count is equal to finish time element 98 count. |
| Scale Timer 94 | Count and perform time scaling function. |
| Force Scaler 100 | Perform force scaling function. |

Phase D ends when counter 92 equals the count from finish time element 98.

It should be noted that circuit elements 102, 106, 108, 109, 110, 111, 112, 114 and 115 continue to function during the setting and resetting of flip-flop circuit 85 by master control 83, however, the output of these circuits will be meaningful only during Phase D when circuit 80 is in the comparison mode.

Thus the pressure vs. time graph 119 (stored in temporary memory 82) is electronically compared using force or pressure matching circuit 88, with previous pressure vs. time graphs stored in permanent storage memory 84 using comparison amplifier 104. The deviation tolerance in force matching can be set by amplifiers 108 and 110 which have the other input sides connected, respectively, to deviation control units 109 and 111. If the output of deviation amplifiers 108 and 110 matches, a signal is transmitted through AND-gate 112 to indicate authentication of the signature on file.

Figure 5:
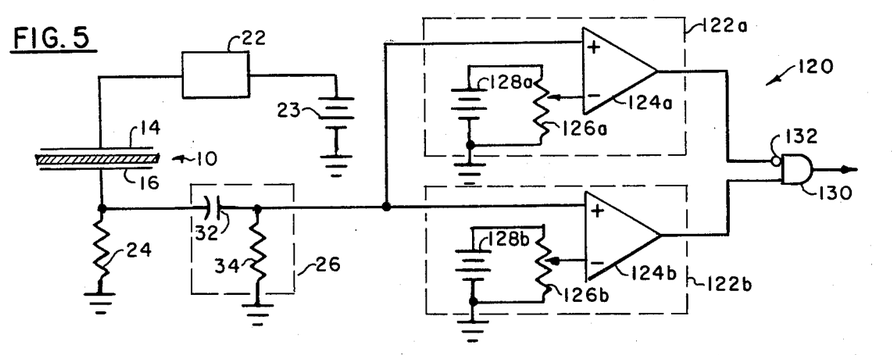
FIG. 5 is a circuit diagram for the pressure sensing mat of the present invention in which two mats are utilized to actuate a device when a pressure level is detected between a predetermine maximum and minimum value.

With reference to FIG. 5, there is illustrated an adaptive maximum-minimum pressure actuator circuit 120 in which a circuit or device is activated only if the pressure applied to the mat comes within maximum and minimum pressure conditions.

The output side of first threshold detector circuit 122 is connected to one side of AND-gate 126 through inverter 128, while the output side of second threshold detector circuit 124 is connected to the other side of AND-gate 126.

In particular, circuit 120 comprises the same circuit elements as the circuit of FIG. 2 with the exception that two threshold detector circuits 122a and 122b are used in place of the single threshold detector 28 of FIG. 2.

Just as in FIG. 2, circuit 120 comprises electrode 14 which is connected to one side of voltage regulator 22 while electrode 16 is connected first to a biasing resistor 24, then to learning circuit 26. Learning circuit 26 can be an optional circuit in circuit 120.

Learning circuit 26, in turn, is connected to the input side of first and second threshold detectors 122a and 122b, respectively.

Similar to FIG. 2, learning circuit 26 of circuit 120 comprises a capacitor 32 connected in series with electrode 16 and first and second voltage threshold circuits 122a and 122b. Resistor 34 of learning circuit 26 is connected in parallel with first and second threshold circuits 122a and 122b.

First and second threshold circuits 122a and 122b are identical and comprise, referring to circuit 122a, operational or comparison amplifier 124a whose one input side (negative) is connected to electrode 16 through learning circuit 26, while its other side (positive) is connected to potentiometer 126a. Potentiometer 126a is connected in series to D.C. power supply 128a.

To operate the adaptive-minimum actuator circuit 120 of FIG. 5, first and second threshold circuits 122a and 122b are manually set to trigger at a particular weight. First threshold detector 122a is set to the maximum weight which will activate a signal while second threshold detector 122b is set to the predetermined minimum which will activate a signal. The next person stepping on mat 10 must come within those maximum and minimum pressure settings in order to cause a signal to be transmitted from AND-gate 130.

Figure 6:
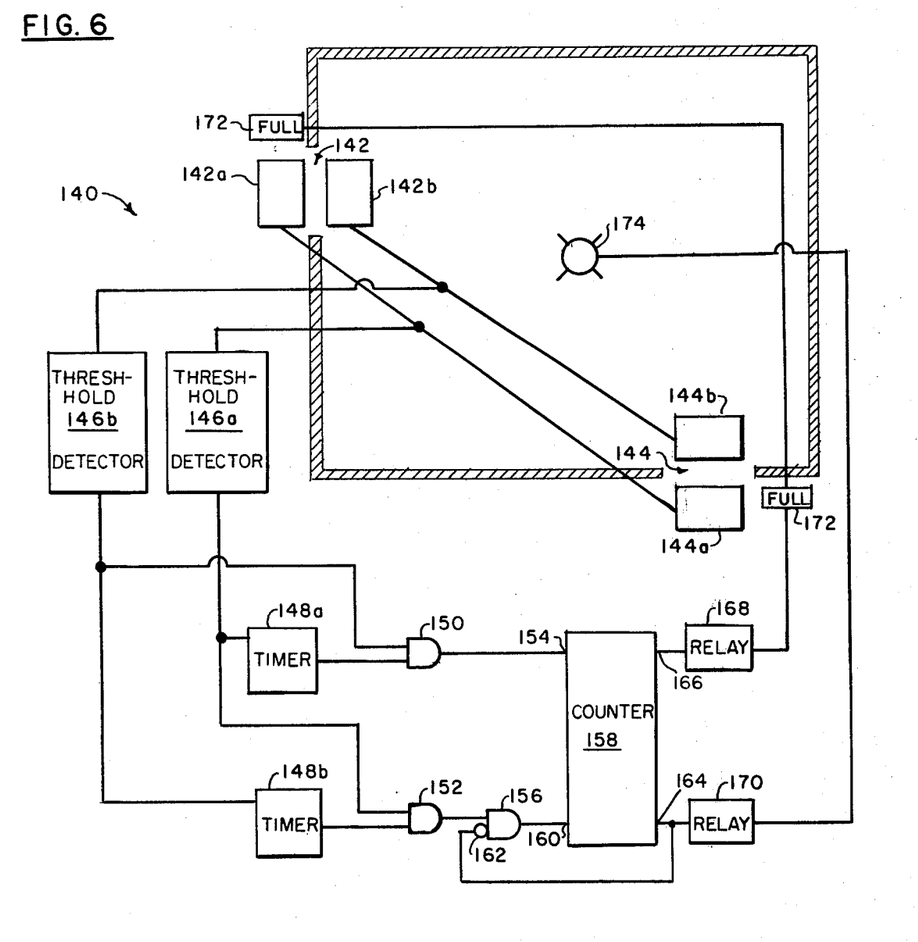
FIG. 6 is a circuit diagram for a pressure sensing mat of the present invention adapted to count the number of vehicles entering and leaving an area and in which functions are performed when the area is empty and when it is full.

With reference to FIG. 6, there is illustrated a circuit using several mats 10 of the present invention in a circuit 140 in which a counting function is performed as, for example, in a garage where, if no cars are present, the lights are turned "off", and where one or more cars are present the lights are turned "on". In addition, when the garage is filled to capacity, a warning sign is activated to advise that no more parking spaces are available. The garage, in addition, can have any number of entrances and exits.

In FIG. 6, circuit 140 comprises two sets of in-out mats 142a–142b and 144a–144b, respectively, at each of the two exit-entrance 142 and 144. Mats 142a and 144a are both connected to threshold detector 146a, while mats 142b and 144b are both connected to threshold detector 146b.

The output of first threshold detector 146a is connected both to the input side of timer 148a and one input side of AND-gate 152, while second threshold detector 146b is connected both to the input side of timer 148b and one input side of AND-gate 150.

The output of timer 148a is connected to the other input side of AND-gate 150, while the output of timer 148b is connected to the other input side of AND-gate 152.

The output side of AND-gate 150 is connected to the "up" count terminal 154 of counter 158, while the output side of AND-gate 152 is connected to one input side of AND-gate 156, whose output side, in turn, is connected to "down" count terminal 160 of counter 158. The other input side of AND-gate 156 is connected, through inverter 162 to the "0" count terminal 164 of counter 158.

The maximum count terminal 166 of counter 158 is connected to relay 168 used to actuate "FULL" warning signs 172 while the "0" count terminal 164 of counter 158 is used to actuate relay 170 when counter 158 is on any count greater than "0". Relay 170 is used to turn light 174 "on" when the count on counter 158 is greater than "0", and "off" when the count is "0".

Thus, in operation, when no cars are in the garage, counter 158 is set to "0" at which condition light 174 is in the "off" condition. As a vehicle enters, for example, entrance 142, it first passes over mat 142a, and then a short time interval later, it passes over mat 142b. Thus two signals, spaced apart in time, are created first by threshold circuit 146a and then second by threshold circuit 146b. The signal transmitted by threshold circuit 146a will be delayed a corresponding interval of time by timer 148a such that the output signal from timer 148a will reach the input side of AND-gate 150 at the same time as the signal from threshold circuit 146b, thus producing an output signal from AND-gate 150 to the "up" count terminal 154 of counter 158 thus raising the count to "1". When this occurs, light 174 is turned "on" by relay 170 and remains on as long as the count is greater than "0".

When a vehicle leaves the garage, the reverse situation occurs whereby a signal is received at the "down" count terminal 160 of counter 158 to subtract a vehicle count from counter 158. The connection of the output side 164 of counter 158 to inverter 162 of AND-gate 156 is for the purpose of preventing a negative count.

After a sufficient number of vehicles have entered the garage area to reach a predetermined maximum count, "max" terminal 166 of counter 158 is activated which also actuates relay 168 to turn "FULL" warning signs 172 "on". As a vehicle leaves the garage, the warning lights 172 are turned "off" when the count is below the predetermined maximum.

Figure 7:
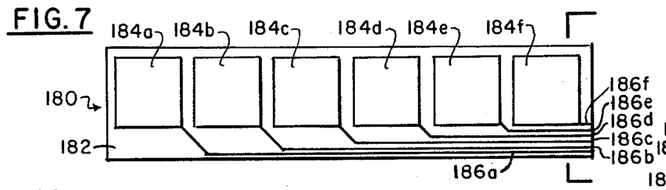
FIG. 7 is a top view of a pressure sensing mat of the present invention adapted to be joined with like mats to define a matrix of mats.
Figure 7A:
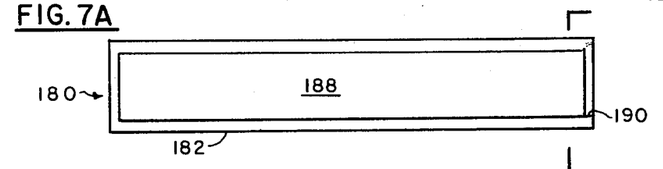
FIG. 7A is a bottom view of the pressure sensing mat of FIG. 7.
Figure 7B:
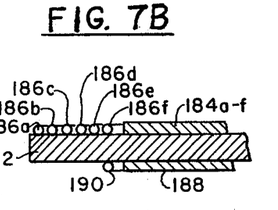
FIG. 7B is an elevational sectional view of the pressure sensing mat of FIG. 7 and 7A taken at line 7—7.

With reference to FIGS. 7, 7A and 7B, there is illustrated a typical modular strip mat 180 for use with other like strip mats to form a matrix of mats defining rows and columns of modular mat units.

In particular, with reference to FIGS. 7 and 7B, there is shown a top view of a typical modular mat unit 180 comprising a core 182 of a sheet of semiconductor material. On top of core 182 are positioned squares 184a through 184f of aluminum, steel or copper foil with electrical conductors 186a through 186f connected, respectively, to squares 184a through 184f and running the length of mat 180 to one end of core 182 where they are adapted to be connected to a suitable plug or contactor (not shown) common in the art.

With reference to FIGS. 7A and 7B, the underside of mat 180 is shown with core 180 covered with a strip 188 of aluminum or copper foil approximately the same size as core 182. A conductor 190 connects strip 188 with a suitable plug connector (not shown) common in the art, for connection to the electrical circuit devices as described and shown elsewhere in the other figures of the drawings and described below.

Figure 8:
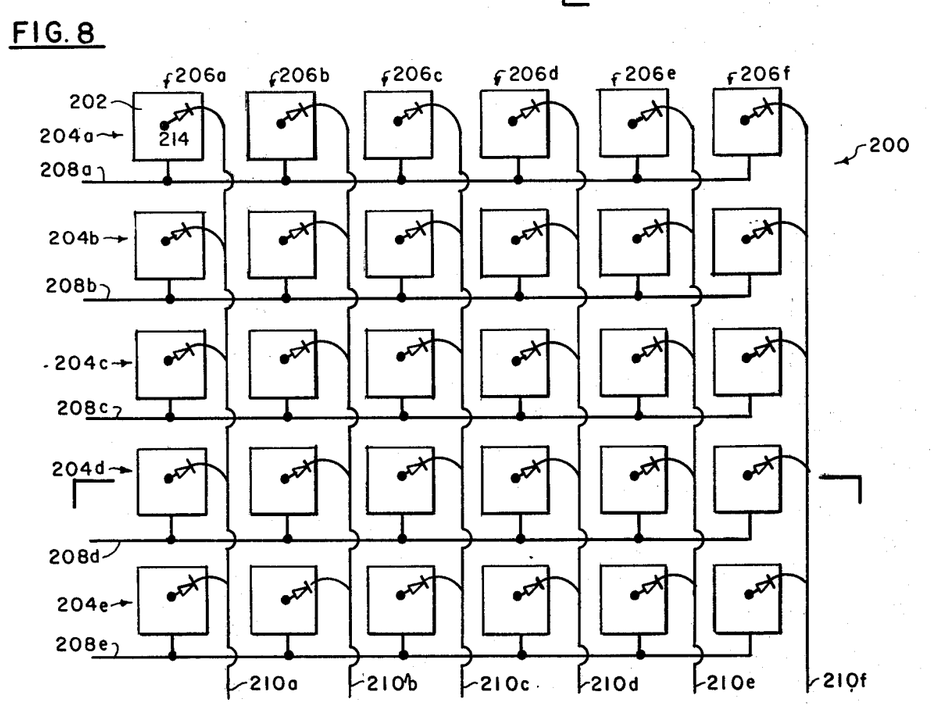
FIG. 8 is a schematic electrical diagram of a matrix of pressure sensing mats of FIG. 7 showing their method of electrical connection as a matrix.
Figure 9:
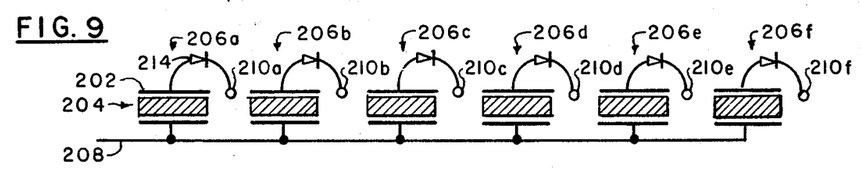
FIG. 9 is an elevational sectional view of the matrix of pressure sensing mats of FIG. 8 taken at line 9—9.

With reference to FIG. 8, there is illustrated a schematic electrical diagram 200 of a matrix of mats 202 of the type illustrated in FIG. 7. The matrix is arranged in rows 204, namely, rows 204a through 204e, and columns 206, namely, columns 206a through 206f.

Conductors 208, namely 208a through 208e, connect the underside of one foil electrode for mat 202 as a row. Since mats 202 can be in the form of an elongated strip running the length of the core, as shown in FIG. 7, conductor 208 can correspond to strip electrode 188 of mat 180 of FIG. 7.

Conductors 210, namely, 210a through 210f connect the top squares of each mat 202 column 206 through connector lead 212 which also contains a diode 214 in series with the top electrode to prevent back flow of current by virtue of a circuit path from an activated mat through an inactivated mat.

Thus, a matrix of mats defining a cartesian coordinate system of X and Y coordinates of mats 202 is provided in which an objects weight can be detected and its position located.

Figure 10:
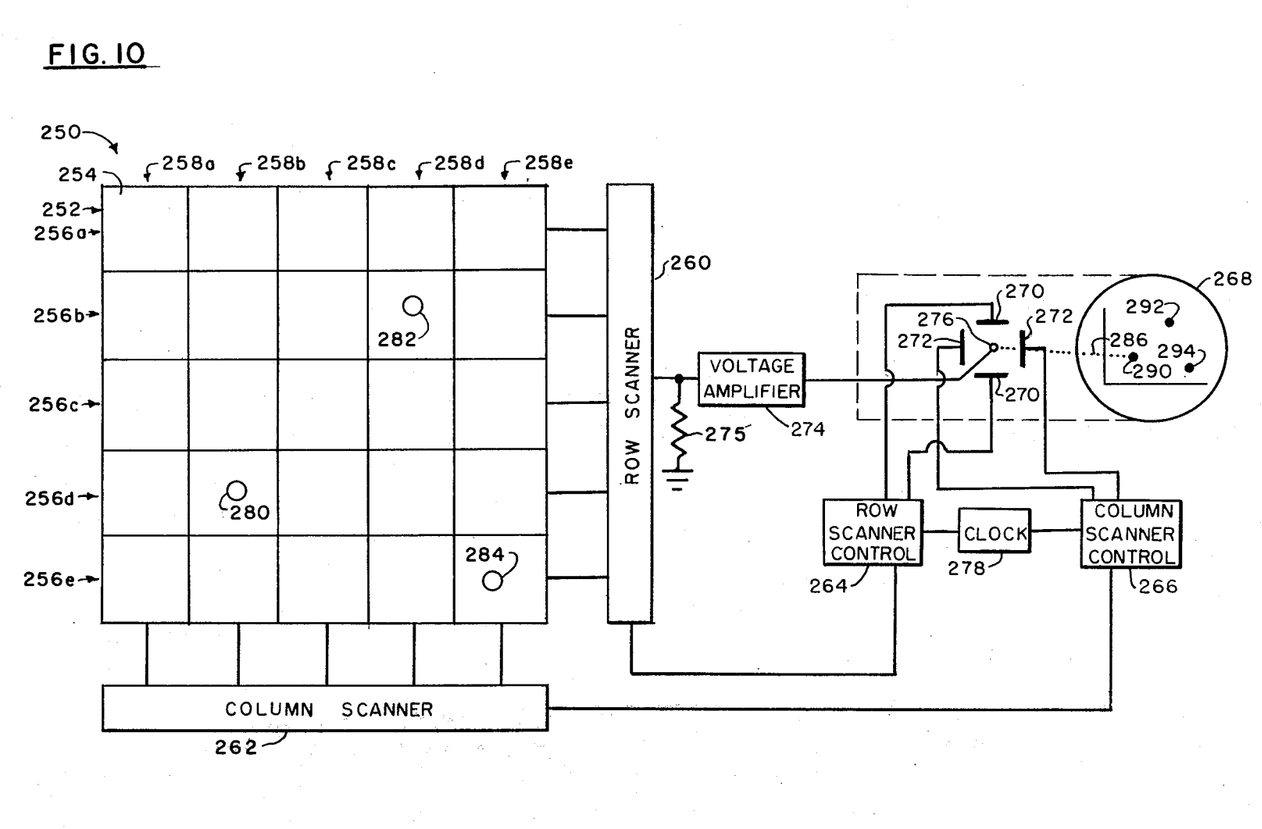
FIG. 10 is a schematic electrical diagram illustrating the use of a matrix of pressure sensing mats adapted to create an X-Y coordinate display of pressure locations on a cathode ray tube.

For example, with reference to FIG. 10, such a mat matrix circuit 250 is shown using a circuit for graphically displaying the coordinate location of the object.

Circuit 250 of FIG. 10 utilizes a matrix 252 of mats 254 arranged in ordered array in rows 256 (256a through 256e) and columns 258 (258a through 258e). In all respects, mat matrix 252 is the same as mat matrix 200 of FIG. 8.

Circuit 250 further comprises a row scanner 260, which is connected to each row 256a through 256e, and a column scanner 262, which is connected to each column 258a through 258e.

Row scanner 260 is connected to and is controlled by row scanner control unit 264, while column scanner 262 is connected to and controlled by column scanner control unit 266.

Row scanner control unit 264 is also connected to vertical deflector plates 270 of cathode ray tube (CRT) 268 while column scanner control unit 266 is connected to horizontal deflection plates 272 of cathode ray tube (CRT) 268.

Also connected to row scanner 260 is voltage amplifier 274 whose suitably amplified output is connected to electron emitting cathode 276 of CRT 268. A load resistor 275 connects the input side of voltage amplifier 274 to ground. The purpose of load resistor 274 is the same as resistor 24 in FIG. 2, namely, when a matrix point is scanned, the current flowing through it is inversely proportional to the resistance of the point. This current then flows through resistor 275 generating a voltage that is inversely proportional to the resistance of the matrix point. An output signal from voltage amplifier 274 which is inversely proportional to the resistance at the matrix point being scanned, is arranged to cause an increase in electron beam brightness at the CRT 268 screen.

A clock or scanner control 278 is connected to both row scanning control unit 264 and column scanning control unit 266 to regulate the rate and sequence of scanning rows 256 and columns 258.

As an example of the operation of circuit 250, weights 280, 282 and 284 are placed on mat matrix 252, respectively, at coordinates 256a–258b, 256b–258d and 256e–258e.

Using clock 278, column scan control unit 266 activates column scanner 262 to begin scanning at column 258a. At the same time, scan control unit 266 energizes horizontal deflection plates 272 of CRT 268 to deflect an electron beam 286 to an appropriate position on the left side of CRT 268 screen. While positioned at column 258a, clock 278 actuates row scanner control unit 264 to cause row scanner 260 to scan rows 256a through 256e in sequence. At the same time, row scanner control unit 264 energizes vertical deflection plates 270 of CRT 268 causing electron beam 286 to deflect vertically in steps corresponding to a row coordinates. Since no weight was placed on any mat in column 258a, no voltage is detected by threshold detector 274 to cause electron beam 286 to become brighter.

However, in the case of column 258b, when column 258b is scanned in the manner previously described for column 258a, when row 256d is reached, weight 280 is detected by threshold detector 274 and a voltage is generated at the output terminals of detector 274. This voltage causes cathode 276 to emit more electrons thus causing beam 286 to generate a bright spot 290 on CRT 268 screen at a coordinate position corresponding to the coordinate position that weight 280 occupies on mat matrix 252.

In a similar manner, spots 292 and 294 are generated corresponding to the coordinate positions of weights 282 and 284.

When a transistor and amplifier are used in threshold detector 274, the intensity of the spots on CRT 268 will vary corresponding to the magnitude of the weight detected by detector 274.

Figure 11:
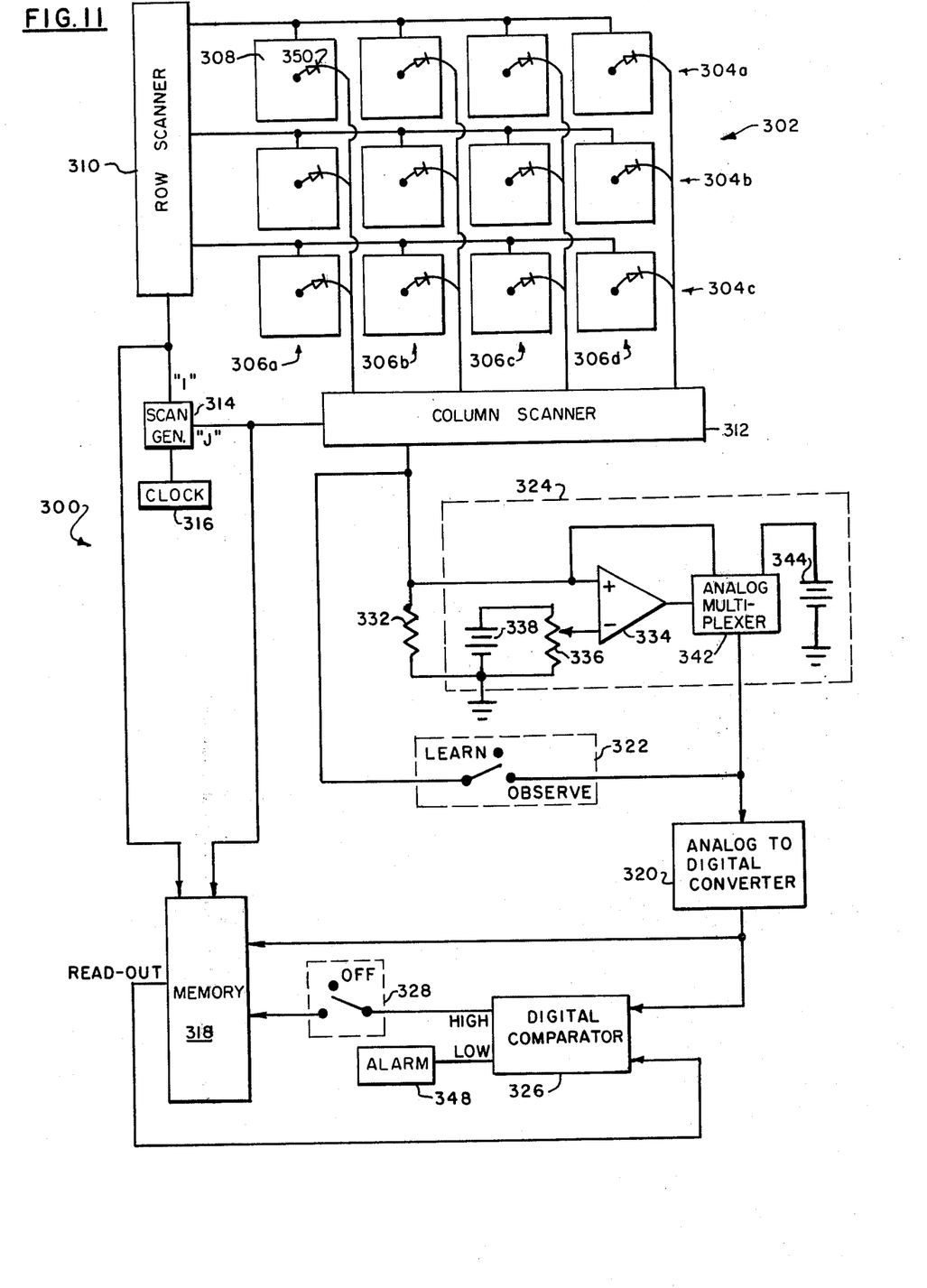
FIG. 11 is a schematic electrical diagram of a matrix of pressure sensing mats of the present invention adapted to detect travel paths and learning paths.

With reference to FIG. 11, there is illustrated a block schematic diagram 300 of a device for area surveillance and path learning.

The circuit comprises, basically, a matrix of mats 302 arranged in rows 304 and columns 306 of individual mats 308.

One side, or electrode, of mats 308 in rows 304 is connected to demultiplexer or "I" or row scanner 310, while the other side, or electrode, of mats 308 defining columns 306 is connected to electronic analog switch or "J" or columns scanner 312.

An "I–J" scan generator 314 is connected to demultiplexer 310 and analog switch 312 which functions to cause all mats 308 to be sequentially scanned according to a predetermined row 304 and column 306 sequence. For example, columns 306a through 306d are scanned for row 304a, then columns 306a through 306d are scanned for row 304b, etc., until all columns have been scanned for all rows. A clock 316 is connected to "I–J" scan generator to regulate the timing of the scan.

A memory 318 is connected to the "I" and "J" outputs of scan generator 314.

The output side of electronic analog switch 312 is connected to analog-to-digital converter 320 either through learn-observe switch 322 or through maximum signal generator circuit 324.

The output or digital signal side of analog-to-digital converter 320 is connected both to the input side of memory 318 and one input side of digital comparator circuit 326. The output of memory 318 is connected to the other input side of digital comparator 326. The "high" output side of digital comparator 326 is connected to the input side of memory 318 though "learn" switch 328.

Maximum signal generator 324 can be an optional additional circuit to circuit 300. The input side of circuit 324 is connected to a load resistor 332, which is always required, having one end connected to the output side of electronic analog switch 312 with the same end also connected to one side of comparison amplifier 334 in circuit 324. The other side of load resistor 332 is connected both to ground and to one side of sensitivity adjusting potentiometer 336 whose other side is connected to ground through power supply 338. The sliding contactor 340 of potentiometer 336 is connected to the other side of comparison amplifier 334. The output side of comparison amplifier 334 is connected to analog multiplexer 342 which, in turn, is connected to the input side of analog-to-digital converter 320. Power is supplied to analog multiplexer 342 by power supply 344.

When operating circuit 300, two modes must be considered, namely, the (1) path or area learning mode, and the (2) path or area observing mode.

In the path learning mode, "I-J" scan generator 314 is used to actuate demultiplexer 310 to first hold on row 304a, that is, to apply a voltage to one side or electrode of mats 308 in row 304a while sequentially switching to each column 306a through d using electronic analog switch 312 which is connected through diode 350 first to column 306a, then column 306b etc., and finally to column 306d (or as many column as might be available). The process is repeated for rows 304b through 304c (or as many rows as might be available). Thus the condition of each mat is individually monitored or sampled.

The weight, pressure or output signal from the mats is switched through electronic analog switch 312 sequentially connecting mats 308 to maximum signal generator 324. Maximum signal generator 324 generates a maximum signal if the input value or pressure is above a predetermined value, otherwise it passes the signal from the mats directly to analog to digital converter 320.

After passing through maximum signal generator 324, the analog output signal from electronic analog switch 312 is converted to a digital signal by analog-to-digital converter 320. Thus any pressure on any of the mats 308 is represented by a digital value.

The purpose of maximum signal generator 324 is to set the memory weight or pressure data for the appropriate mats 308 to the maximum value so that during the observation mode, there will be no pressure or path mat that will cause a high signal when compared with the associated value in memory 318.

Concurrently, the scanning sequence is recorded in memory 318 so that each mat is addressed in memory 318 and concurretly provided with a corresponding digital pressure value as mat matrix 302 is sequentially scanned.

Thus, as a person walks over a path while the apparatus is in the learning mode, the values of weight in memory 318 associated with each mat walked upon will be those generated by the weight of the person, while the values for all other mats will be generated by the ambient weight conditions.

After the path learning is completed, switch 322 is connected to the "observe" condition and switch 328 is switched to "off".

The apparatus is now in the path observing mode. While in this mode "I-J" scan generator 314 continuously scans the rows and columns as it did in the learning mode. In the observing mode, maximum signal generator 324 is by-passed to provide only the output signal from mats 308 to analog to digital converter 320. The output side of digital comparator 326 is disconnected from memory 318, but its input side remains connected to the output of memory 318. Now, if any mat not in the learning path shows a pressure, memory 318 will read out the recorded pressure which is compared by digital comparator 326 with the input signal. If a difference exists, alarm 348 will sound.

I claim:

1. A pressure detecting device comprising
   a circuit,
   a thin resiliently deformable sheet of semiconductor material having an internal electrical conductivity generally invariable according to applied pressure, the surface of said semiconductor material having microscopic ridges and depressions therein,
   a first electrode connected to said circuit comprising a flexible sheet of electrically conductive metal foil, selected from the group consisting of copper, steel and aluminum and alloys thereof, in mechanical contact with one side of said resiliently deformable sheet material and electrically connected to said circuit,
   a second electrode connected to said circuit comprising a flexible sheet of electrically conductive metal foil, selected from the group consisting of copper, steel and aluminum and alloys thereof, in mechanical contact with the other side of said resiliently deformable semiconductor sheet material and electrically connected to said circuit, and
   said circuit being responsive to deforming of said microscopic ridges and depressions in the presence of applied pressure on said first electrode, resiliently deformable semiconductor sheet and second electrode combination for providing an output signal that is a function of said applied pressure.

2. The device as claimed in claim 1 wherein
   said thin resiliently deformable sheet of semiconductor material comprises
   a thin sheet of fibrous non-conducting material impregnated with colloidal graphite and having a surface roughened to form said microscopic ridges and depressions.

3. The device as claimed in claim 1 wherein
   said thin resiliently deformable sheet of semiconductor material comprises
   a thin sheet of plastic having colloidal graphite suspended therein and having a surface roughened to form said microscopic ridges and depressions.

4. The device as claimed in claim 1 wherein said circuit comprises
   means for applying an electrical signal across said first and second electrodes, and means for detecting a threshhold pressure upon application of said pressure to said first electrode, resiliently deformable semiconductor sheet and second electrode combination.

5. The device as claimed in claim 4 further comprising
a learning circuit connected to said circuit and adapted to measure an initial pressure and immediately thereafter cause said means for detecting a threshold pressure to be actuated when a pressure greater than said initial pressure is applied to said first electrode, resiliently deformable semiconductor sheet and second electrode combination.

6. The device as claimed in claim 4 further comprising
means for regulating said means for applying an electrical signal across said first and second electrodes.

7. The device as claimed in claim 1 wherein said circuit comprises
means for detecting a predetermined minimum and maximum pressure on said electrodes, and
means for providing an output signal from said circuit when said pressure applied to said first electrode, resiliently deformable semiconductor material and second electrode combination is between said maximum and minimum pressure.

8. A pressure transducer comprising
a thin resiliently deformable sheet of semiconductor material having an internal electrical conductivity generally invariable according to applied pressure, the surface of said semiconductor material having microsopic ridges and depressions therein,
a first electrode comprising a flexible sheet of electrically conductive material disposed in mechanical contact with one side of said resiliently deformable semiconductor sheet material,
a second electrode comprising a flexible sheet of electrically conductive material disposed in mechanical contact with the other side of said resiliently deformable semiconductor sheet material,
a circuit adapted to provide an output signal, said circuit being responsive to deforming of said microscopic ridges and depressions in the presence of applied pressure on said first electrode, resiliently deformable semiconductor sheet and second electrode combination for providing an output signal that is a function of said applied pressure, and,
means for connecting said first and second electrodes to said circuit.

* * * * *